May 6, 1930.    G. H. GILMAN    1,757,767
PNEUMATIC HAMMER
Original Filed Jan. 10, 1922
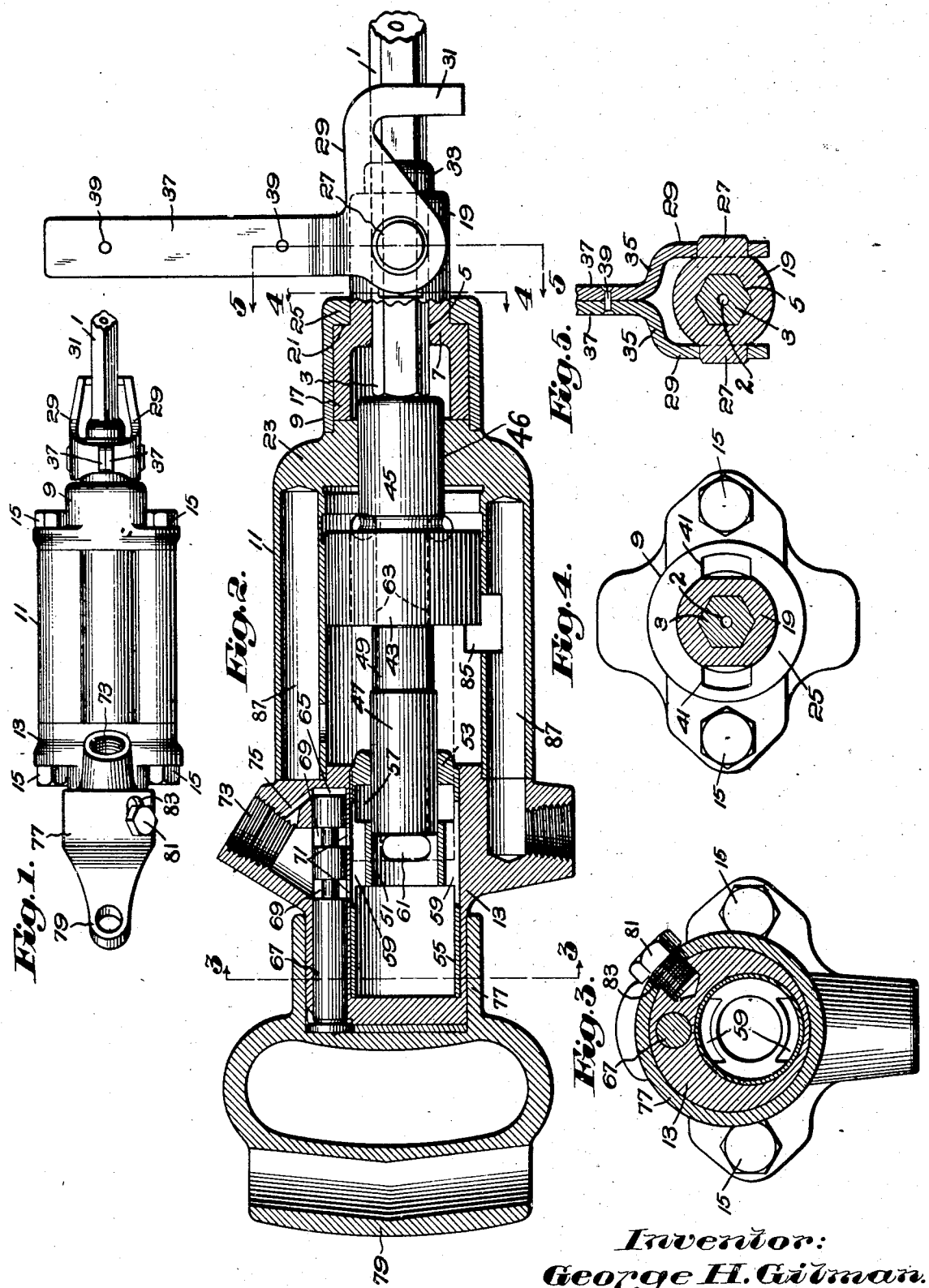
Inventor:
George H. Gilman.

Patented May 6, 1930

1,757,767

UNITED STATES PATENT OFFICE

GEORGE H. GILMAN, OF BELMONT, MASSACHUSETTS

PNEUMATIC HAMMER

Application filed January 10, 1922, Serial No. 528,272. Renewed September 25, 1929.

My invention relates to pneumatic hammers and particularly to one for operating rock working tools.

My invention will be best understood from the following description when read in light of the accompanying drawings, which show one specific embodiment of my invention selected for illustrative purposes, while the scope of my invention will be more particularly pointed out in the appended claims.

In the drawings:—

Fig. 1 is an elevation of a pneumatic hammer arranged for drilling rock;

Fig. 2 is a longitudinal section according to Fig. 1 with some parts shown in elevation;

Figs. 3, 4 and 5 respectively are sections on the lines 3—3, 4—4 and 5—5 of Fig. 2.

Referring to the drawings showing the embodiment of my invention selected for illustrating the same I have indicated the tool by the hollow drill steel 1, provided with the usual axial bore 2 extending throughout its length for conducting cleansing fluid from the chuck to the bit and discharging such fluid into the drill hole for removing rock cuttings. The tool has a polygonal shank 3 slidably mounted in the socket 5 of the chuck 7, the socket being of cross-section similar to the shank in order that when the chuck is rotated the drill steel will be rotated with it.

The casing for my pneumatic hammer in the submitted embodiment comprises a chuck casing 9, a main cylinder section 11 and a rearward cylinder section 13. These parts are held in assembled relation by means of a pair of through-bolts or side rods 15.

The chuck comprises the rearward portion 17 of large diameter and a forward portion 19 of smaller diameter, this construction affording a shoulder 21. The portion 17 of the chuck is rotatively mounted in the chuck casing, while the portion 19 projects from the chuck casing. The chuck is held against longitudinal movement by causing its rearward end to abut the forward face of the front cylinder head 23 and the shoulder 21 of the chuck to abut the smaller diameter portion or flange 25 of the chuck casing.

At diametrically opposite points on the projecting portion 19 of the chuck I provide lugs or trunnions 27. In the submitted embodiment of my invention I have shown these trunnions carrying an attachment which serves both as a handle for rotating the chuck and as a tool retainer. This attachment comprises side members 29, the forward ends of which as shown by Fig. 2, carry the ends of the yoke 31 constructed to embrace the drill steel forwardly of the collar 33 formed on said steel. The rearward portion of the side arms are perforated to receive the trunnions 27 and each has integrally formed therewith an offset portion 35 extending toward the medial plane of the hammer. These offset portions have formed integrally therewith radially extending portions 37, the two portions 37 lying in contact and respectively on opposite sides of the medial plane and being fastened together in any suitable manner, as for example, by means of pins 39. The portion 19 of the chuck adjacent to and in contact with the side members 29 is flattened on the cord connecting the intersections of the outer surfaces of the chuck and trunnions as viewed in Fig. 5. To permit the insertion of the chuck, the flange 25 of the chuck casing is cut away at 41 to permit the trunnions to pass through said flange.

Although I may make the attachment in the form of a casting of malleable material or of cast material rendered malleable, I prefer to stamp or cut the same out of steel alloy and to bend it to shape.

It will be noted that the portions 35 of the attachment constitute a member bridging the side members of the retainer adjacent the trunnions and that said bridge member carries the handle 37; further that this handle is freely pivoted to swing in a longitudinal plane including the axis of the machine which arrangement prevents vibration from being transmitted to the hand of the operator.

In the present embodiment of my invention I have shown a piston having a head 43 and a hammer bar 45, the cylinder being formed with a bore 46 for receiving the hammer bar 45 and the latter being adapted to enter the chuck by way of such bore during the forward stroke of the piston and strike the end of the shank of the drill steel. For admitting fluid to opposite sides of the head 43 and thereby causing the piston to reciprocate, I provide a valvular member 47, which, although it may be otherwise constructed, in the present embodiment of my invention, is formed integrally with the head 43. The forward portion of the member 47 is reduced in diameter as is indicated at 49, while the body portion of said member reciprocates in the bore 51 of a bushing or sleeve 53 carried by the rearward cylinder section 13.

The bushing 53 is provided with a rearward chamber 55 and a forwardly located annular groove 57, the chamber and groove being connected by a pair of slots 59 formed in the exterior surface of said bushing. In quartering relation with the slots are ports 61, which connect with passages 63 leading to the forward end of the piston chamber for the head 43.

Referring to Figs. 1, 2 and 3, I have shown the rearward portion of the exterior surface of the rearward cylinder section 13 as cylindrical, while the bore receiving the bushing 53 I have shown formed eccentrically to this surface. In the thickened portion of the wall thus formed I provide a second bore 65 of smaller diameter and parallel to the first bore. In this bore I mount for reciprocation a valve plunger 67 provided with a pair of annular grooves 69. In position to be opened and closed by the valve 67 I provide a pair of openings 71 which connect the bore 65 with the bore containing the bushing and as shown by Fig. 2, these openings are in direct communication with one of the slots 59 of the bushing.

The motive fluid supply to the hammer is indicated by the hose connection 73, which is in communication with the bore 65 opposite the openings 71, as shown by Fig. 2. The forward end of the bore 65 is connected to the hose connection by means of a passage 75 so that the valve will be always forced rearwardly toward closing position.

On the cylindrical portion of the rearward cylinder section I mount a sleeve 77, which carries a supporting handle 79, said sleeve having a lost motion connection to the cylinder section afforded by the stud 81 and slot 83. It will be noticed by this construction that when the tool is presented to the work, the handle may be forced forwardly, thereby opening the valve, the position of parts at this time being as shown by Fig. 2. When the pressure on the handle is relieved, the air acting on the forward end of the valve will push the valve rearwardly, carrying with it the handle, and will close the openings 71. By using a plurality of openings 71, I am able to provide a valve of smaller diameter for the required supply of air for the hammer and thereby am able to reduce the effort necessary to push the handle forward to open the valve.

By locating the valve beside the bushing, I am enabled to materially reduce the length of the machine.

When the handle is forced forwardly to open the valve 67 the air from the hose connection 73 passes around the annular grooves 69 of said valve into the openings 71 and hence to the chamber 55 and groove 57 of the bushing 53. In the position of parts shown by Fig. 2 air will pass through the ports 61 and passages 63 to the forward end of the cylinder to drive the piston rearwardly. When the member 47 has been moved rearwardly far enough for the reduced diameter portion 49 thereof to establish communication between the groove 57 and the rearward end of the piston chamber for the head 9, the piston will be driven forwardly. For exhausting opposite ends of the piston chamber for the head I provide an exhaust port 85 adapted to be overrun by the head 9 and communicating with the atmosphere by way of a passage 87. When the hammer bar 45 of the piston withdraws from the bore 46 during the rearward stroke motive fluid will enter the chuck and discharge into the drill hole through the hollow drill steel.

It will be noted that with the "push throttle" type of throttle valve employed, it is impossible in the absence of some other means for the purpose, to pull the steel from the hole and at the same time operate the hammer, which is a decided disadvantage for many kinds of work. With my pneumatic hammer as submitted, the tool may be withdrawn from the work by means of the handle 37, which when operated to cause such withdrawal, will cause the retainer to move into its engaging position. At the same time, the tool may be rotated, and by pressing forward the handle 79, which may be readily done owing to the small size of the throttle, the hammer may be operated and air be admitted to the drill hole. The handle 37 and the retainer also enables me to employ my hammer in many situations where heretofore it has been impossible to use a push throttle.

Although I have described for purposes of illustration one specific embodiment of my invention, it is to be understood that I am not limited thereby to the particular mechanical details of this embodiment but that within the scope of my invention wide deviations may be made therefrom without departing from the spirit of my invention.

Claims:

1. A pneumatic hand hammer having, in combination, a casing, a supporting handle carried by said casing for relative movement, a throttle for controlling the operation of said hammer arranged to be opened by forward movement of said handle relative to said casing and to be closed by rearward movement of said handle relative to said casing, a rotary chuck formed for receiving a drill steel, a handle for rotating said chuck, the last mentioned handle being pivoted to said chuck and carrying a drill steel retainer so disposed as to engage the drill steel when said handle is swung rearward, whereby said steel may be withdrawn from the drill hole while being rotated and with the hammer operating.

2. A pneumatic hand hammer having, in combination, a casing carrying a push throttle, a rotary chuck carried by said casing, said chuck being formed for receiving a drill steel, a relatively movable handle carried by said chuck for rotating it, a drill steel retainer for preventing withdrawal of said steel from said chuck, said retainer being moved into steel restraining position upon rearward pressure on said handle, whereby said steel may be withdrawn from the drill hole by rearward pressure on said handle and said hammer may be operated while said steel is being withdrawn.

3. A pneumatic hand hammer having, in combination, a casing carrying a push throttle, a rotary chuck carried by said casing, said chuck formed for receiving a drill steel, a drill steel retainer and a chuck rotating handle carried by said chuck, said handle being operative upon rearward movement thereof to actuate said retainer into operative position and to withdraw said steel from the drill hole.

4. A pneumatic hand hammer having, in combination, a push throttle, a rotary chuck formed for receiving a drill steel, a handle carried by said chuck for rotating it, and means including said handle for pulling said steel away from the work upon rearward pull on said handle.

5. A pneumatic hand hammer for operating a drill steel having, in combination, a rearward supporting handle, a push throttle operated into open position by forward pressure on said handle, and means including a second handle for pulling said steel away from the work whereby said push throttle may be actuated into open position while the tool is being withdrawn from the drill hole.

6. A pneumatic hammer, having in combination, a tool holder, a pivoted tool retainer, and a radially extending handle carried by said retainer, said handle arranged to move the latter into retaining position when moved to pull the tool away from the work.

7. In a pneumatic hammer, a rotary chuck, a handle for rotating said chuck, and means for retaining the tool therein, said means operated by said handle.

8. In a pneumatic hammer, a rotary chuck, means for rotating said chuck, and means for retaining the tool therein, said last mentioned means being operated by said first mentioned first means.

9. In a pneumatic hammer, a rotary chuck, a tool retainer, a handle for actuating said retainer into and out of tool engaging position, said retainer and handle being carried by said chuck, and said handle when said retainer is in tool engaging position being disposed generally radially of said chuck.

10. In a pneumatic hammer, a chuck casing, a chuck mounted in said casing and projecting forwardly thereof, trunnions carried by said chuck, and a handle for rotating the chuck carried by said trunnions for swinging in a plane longitudinally of said hammer.

11. In a pneumatic hammer, a chuck casing, a chuck rotatably mounted in said casing and projecting forwardly thereof, trunnions carried by said chuck, and a combined drill steel retainer and chuck rotating handle carried by said trunnions.

12. In a pneumatic hammer, a chuck casing, a chuck rotatably mounted in said casing and projecting forwardly thereof, the projecting portion of said chuck having trunnions, a drill steel retainer carried by said trunnions, and means for rotating said chuck.

13. In a pneumatic hammer, a tool retaining yoke comprising side members and a tool engaging part carried by the ends of said members, means providing a mounting for said side members, and a member bridging said side members.

14. In a pneumatic hammer, a tool retaining yoke comprising side members and a tool engaging part carried by the ends of said members, means providing a pivotal mounting for said side members at points remote from said part, and means connecting said side members adjacent said pivotal mounting.

15. In a pneumatic hammer, a tool retaining yoke comprising side members and a tool engaging part carried by the ends of said members, means providing a pivotal mounting for said side members at points remote from said part, means connecting said side members adjacent said pivotal mounting, and a handle carried by said last named means.

16. In a pneumatic hammer, a chuck mounted for rotation, and a chuck rotating handle and a tool retainer carried by said chuck.

17. In a pneumatic hammer, a tool engaging part, side members formed integrally with opposite ends of said part, trunnions for mounting said side members, a portion integral with each side member and formed to extend toward a medial plane of the hammer, a handle part integral with each of said portions, and said handle parts being juxtaposed at opposite sides of said medial plane.

18. In a pneumatic hammer, a yoke having a tool engaging part carried by side arms, means providing a pivotal mounting for said side arms, and a yoke operating handle carried by one of said side arms.

19. A hammer rock drill having at its forward end a chuck formed for carrying a collared hollow drill steel in non-rotatable relation thereto, a handle pivoted to said chuck for swinging longitudinally of said chuck, a retainer for engaging said drill steel forwardly of its collar, said retainer being operated to move into engaging position when said handle is swung rearwardly, a handle at the rear end of said rock drill having a socket receiving the end of the casing for said rock drill, said handle and casing having a limited movement lengthwise of said rock drill, a reciprocatory valve in said casing arranged lengthwise thereof and having a stem projecting from the rearward end of said casing so as to abut the bottom of said socket of said last mentioned handle, said valve controlling the admission of motive fluid to said rock drill for actuation thereof and for passage through said hollow drill steel, and means for constantly forcing said valve rearwardly.

20. A hammer rock drill having at its forward end a chuck formed for carrying a collared hollow drill steel in nonrotatable relation thereto, a handle pivoted to said chuck for swinging longitudinally of said chuck, a retainer for engaging said drill steel forwardly of its collar, said retainer being operated to move into engaging position when said handle is swung rearwardly, the casing for said rock drill having a cylindrical end eccentric to the axis of said rock drill, said end having a piston chamber and a valve chamber arranged side by side, a valve in said valve chamber for controlling admission of motive fluid to said rock drill for actuation thereof and for passage through said hollow drill steel, said valve having a stem projecting rearwardly from said casing, a plurality of admission passages controlled by said valve, a handle having a socket receiving said cylindrical end of said casing, said handle and casing having a limited relative movement lengthwise of said rock drill, said valve abutting against the bottom of said socket, and means for admitting fluid pressure against a forwardly directed surface of said valve for forcing said valve rearwardly.

21. A pneumatic hammer having in combination, a cylinder, a hammer piston for actuating a hollow drill steel, a supporting handle carried by said cylinder for movement relatively thereto when the cylinder is forced by said handle toward or from the work, a valve actuated by movement of said supporting handle relatively to said cylinder, means for admitting motive fluid to said hollow drill steel when said valve is actuated by forcing the handle in that direction which moves said cylinder toward the work, and a second supporting handle for actuating relative movement between said first mentioned supporting handle and cylinder whereby motive fluid may be admitted to said hollow drill steel while the latter is being withdrawn from the drill hole.

22. A pneumatic hammer having in combination, a cylinder, a hammer piston, for actuating a hollow drill steel, a supporting handle carried by said cylinder for movement relatively thereto when the cylinder is forced by said handle toward or from the work, a valve actuated by movement of said supporting handle relatively to said cylinder, means for admitting motive fluid to said cylinder for actuation of said hammer piston and to said hollow drill steel when said valve is actuated by forcing the handle in that direction which moves said cylinder toward the work, and a second supporting handle for actuating relative movement between said first mentioned supporting handle and cylinder, whereby said hammer may be actuated and motive fluid may be admitted to said hollow drill steel while the latter is being withdrawn from the drill hole.

23. A pneumatic hammer having in combination, a cylinder, a hammer piston for actuating a hollow drill steel, a supporting handle carried by said cylinder for movement relatively thereto when the cylinder is forced by said handle toward or from the work, a valve actuated by movement of said supporting handle relatively to said cylinder, means for admitting motive fluid to said hollow drill steel when said valve is actuated by forcing the handle in that direction which moves said cylinder toward the work, a second supporting handle for actuating relative movement between said first mentioned supporting handle and cylinder, said second supporting handle having an operative connection to said drill steel for rotating it, whereby motive fluid may be admitted to said hollow drill steel while the latter is being rotated and withdrawn from the drill hole.

24. A pneumatic hammer having in combination, a cylinder, a hammer piston for actuating a hollow drill steel, a supporting handle carried by said cylinder for movement relatively thereto when the cylinder is forced by said handle toward or from the work, a valve actuated by movement of said supporting handle relatively to said cylinder, means for admitting motive fluid to said cylinder for actuation of said hammer piston when said valve is actuated by forcing the handle in that direction which moves said cylinder toward the work, means controlled by said hammer piston for admitting motive fluid to said hollow drill steel, and a second supporting handle for actuating relative movement between said first mentioned supporting handle and cylinder, whereby said hammer piston may be actuated and motive fluid may be admitted to said hollow drill steel while the latter is being withdrawn from the drill hole.

25. A pneumatic hammer having in combination, a cylinder, a hammer piston for actuating a hollow drill steel, a supporting handle carried by said cylinder for movement relatively thereto when the cylinder is forced by said handle toward or from the work, a valve actuated by movement of said supporting handle relatively to said cylinder, means for admitting motive fluid to said cylinder for actuation of said hammer piston and to said hollow drill steel when said valve is actuated by forcing the handle in that direction which moves said cylinder toward the work, a second supporting handle for actuating relative movement between said first mentioned supporting handle and cylinder, said second supporting handle having an operative connection to said drill steel for rotating it, whereby said hammer piston may be actuated and motive fluid may be admitted to said hollow drill steel while the latter is being rotated and withdrawn from the drill hole.

26. A pneumatic hammer having in combination, a cylinder, a hammer piston for actuating a hollow drill steel, a supporting handle carried by said cylinder for movement relatively thereto when the cylinder is forced by said handle toward or from the work, a valve actuated by movement of said supporting handle relatively to said cylinder, means for admitting motive fluid to said hollow drill steel when said valve is actuated by forcing the handle in that direction which moves said cylinder toward the work, a second supporting handle for actuating relative movement between said first mentioned supporting handle and cylinder, said second supporting handle having an operative connection to said tool for rotating it, and a releasable drill steel retainer actuated into engaging position by movement of said second supporting handle in the direction in which it withdraws said cylinder from the work, whereby motive fluid may be admitted to said hollow drill steel while the latter is being rotated and withdrawn from the drill hole.

27. A pneumatic hammer having, in combination, a casing containing a hammer piston, a chuck formed for carrying a hollow drill steel actuated percussively by said piston, conduit means for admitting drill-hole-cleansing-fluid to the bore of said drill steel, valve means for controlling the passage of said fluid through said conduit means, a pair of supporting handles for said casing spaced longitudinally thereof, said handles being mounted for movement toward and away from each other longitudinally of said casing, said handles being operatively connected to said valve means for actuating the latter into open position when said handles are moved relatively toward each other.

28. A pneumatic hammer having, in combination, a casing containing a hammer piston, a chuck formed for carrying a hollow drill steel actuated percussively by said piston, conduit means for admitting drill-hole-cleansing-fluid to the bore of said drill steel, valve means for controlling the passage of said fluid through said conduit means and into said casing for actuation of said piston, a pair of supporting handles for said casing spaced longitudinally thereof, said handles being mounted for movement toward and away from each other longitudinally of said casing, said handles being operatively connected to said valve means for actuating the latter into open position when said handles are moved relatively toward each other.

In testimony whereof, I have signed my name to this specification.

GEORGE H. GILMAN.